Dec. 17, 1957 W. P. MILLER ET AL 2,816,538
PICNIC GRILL
Filed Jan. 19, 1950
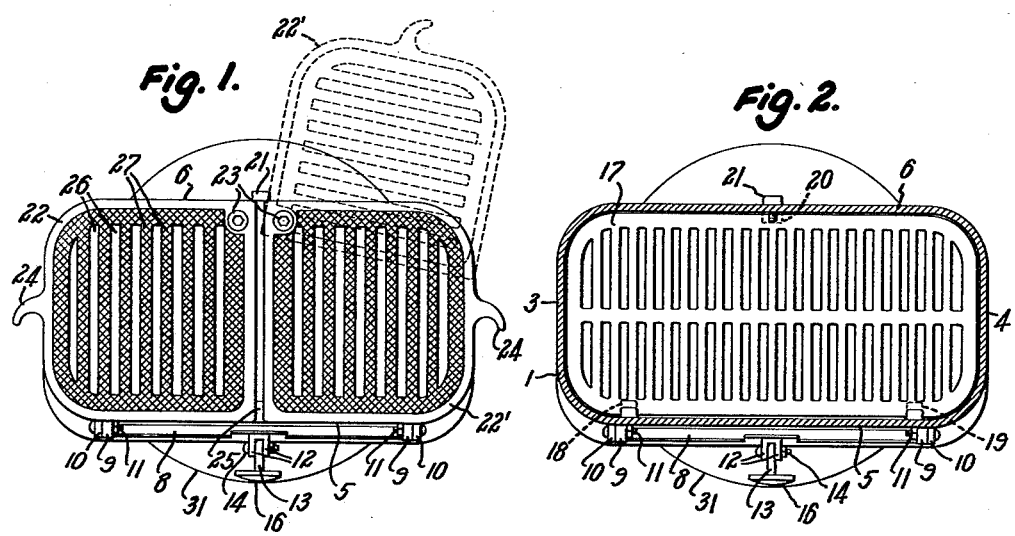
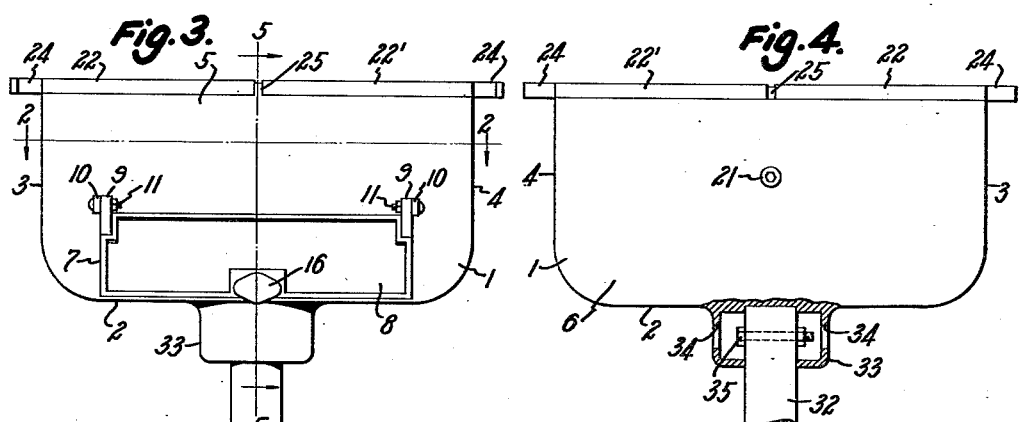
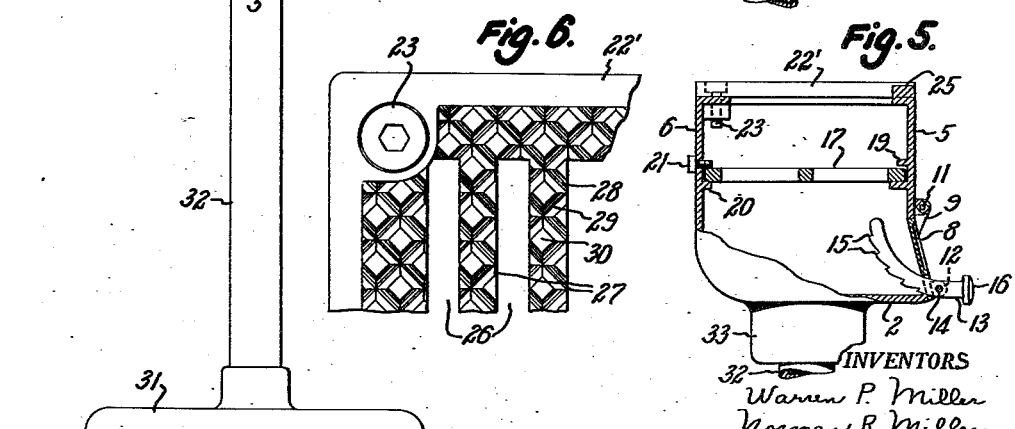
INVENTORS
Warren P. Miller
Norman R. Miller
Ralph E. Williams
By Pierce, Scheffler & Parker
Attys.

United States Patent Office 2,816,538
Patented Dec. 17, 1957

2,816,538

PICNIC GRILL

Warren P. Miller, Norman R. Miller and Ralph E. Williams, Anderson, Ind., assignors to American Playground Device Co., Anderson, Ind., a corporation of Indiana Application January 19, 1950, Serial No. 139,378

1 Claim. (Cl. 126—25)

The present invention relates to stoves designed for outdoor use and in particular to those of the type adapted to burn charcoal. These stoves are popularly known as "picnic grills" and are ideal for use in public parks or backyards in preparing barbecues or broiling steaks.

An object of the present invention is to provide an improved construction for the grill which assures faster and easier fire kindling, better, more intense and more uniform heat, cleaner cooking, better food flavors and more economical fuel consumption.

Another object is to provide an improved construction for the grid that covers the fire pot proper and which develops a much larger heating surface than has heretofore been obtainable with conventional plane surfaced grids.

Yet another object is to provide an improved support for the fuel grate in the fire pot which discourages unauthorized removal.

The foregoing as well as other objects and advantages inherent in the improved construction will become more apparent from the following detailed description of a preferred embodiment and the accompanying drawings in which:

Fig. 1 is a top plan view of the grill;

Fig. 2 is a horizontal section taken on line 2—2 of Fig. 3;

Figs. 3 and 4 are front and rear elevations;

Fig. 5 is a vertical transverse section on line 5—5 of Fig. 3; and

Fig. 6 is a detail of a portion of one of the grid plates drawn to an enlarged scale.

Referring now to the drawings, the grill includes a one-piece, and preferably cast fire bowl 1 having a bottom wall 2, end walls 3 and 4, and front and rear walls 5 and 6. While relative dimensions of the various walls are not critical, we prefer that the bowl be longer than it is wide, and that the height be about the same as the width.

The end and rear walls are imperforate but the front wall 5 is cast with a rectangular opening 7, the bottom of which is on a line with the bottom wall 2, for receiving a door 8. The latter has ears 9 at each side thereof adjacent the top edge which cooperate with lugs 10 cast on the front wall and pins 11 to form a hinge connection for pivotally attaching the door to the wall.

Midway of the door 8 along the bottom edge are lugs 12 to which a lever 13 is pivoted intermediate its ends by pin 14. As seen in Fig. 5, lever is curved and the portion extending within the bowl 1 is provided with a plurality of notches 15 which cooperate with the bottom wall 2 to hold the draft door 8 open at any one of the plurality of notch positions to regulate the draft. The outer end of lever 13 is knobbed at 16 to facilitate handling.

The one-piece cast construction of the bowl 1 incorporating but a single door 8 assures positive control over the draft since there is no other possible way in which a draft can be obtained. Door 8 also doubles as a clean-out door for removing ashes from the ash pit section of the bowl below the grate 17.

As seen in Figs. 2 and 5, the grate 17 for holding the fuel which may be charcoal, wood or the like is of one-piece construction and is supported horizontally in the bowl at about the mid-plane thereof by three lugs 18, 19, 20. Two of the latter 18, 19 cast integrally with the front wall 5 in spaced relation are channelled to receive one side of the grate 17; the third lug 20 cast integral with the rear wall 6 and located intermediate the other two lugs forms a rest for the other side of grate 17. After the grate has been placed in position on the lugs, a screw 21 is preferably threaded through the rear wall 6 at a point just above lug 20 to lock the grate in place and thereby discourage unauthorized removal. This may be particularly desirable where the grill is placed in public parks lacking close supervision over equipment.

The top of bowl 1 is closed by a pair of grid plates 22, 22' which rest thereon and are pivotally connected to the rear wall 6 at their inside corners by pins 23 in such manner that the plates can be swung rearwardly in opposite directions by finger lugs 24 from a closed position adjacent stop 25 as shown in full lines in Fig. 1 to an open position as indicated in broken lines in this same view in order to load the bowl with fuel, or to remove a steak or other food being cooked on the grid or to warm foods.

Each grid plate is formed with a plurality of parallel slots 26 extending transversely of the front and rear bowl walls to provide a draft for the fire, and as viewed in Fig. 6, the top face of the grid bars 27 which define slots 26, as well as a marginal portion of the plates 22, 22' around the slotted area, is provided with two series of paralled spaced V-shaped grooves 28, 29 which preferably run at right angles to each other and diagonally of the plate sides in a criss-crossing manner thereby to establish a grid surface pattern of flat-topped pyramids 30. By such construction, the effective heat radiating surface of the grid is increased to about 60% greater than that available on a grid of comparable size with a plane top surface thereby decreasing the cooking time and reducing fuel consumption correspondingly. Moreover, since the steak rests directly and entirely upon the tops of the pyramids 30, the hot gasses rising through slots 26 and carrying the much desired charcoal odor are free to circulate under the steak in the grooves 28, 29 with the result that almost the entire under area of the steak is permeated by the odor which materially improves its flavor.

The entire grill bowl 1 is revolubly mounted on a pedestal to provide for cooking to the windward in order to assure a satisfactory draft through door 8 and also to keep smoke away from the chef. The pedestal includes a base plate 31 heavy enough to prevent the bowl from toppling easily and an upright pipe 32. The upper end of pipe 32 is received in a collar 33 integral with the bowl bottom and which also forms a bearing enabling the bowl to be swung in any direction on its pedestal to the best position as regards wind direction. Collar 33 is also provided with a pair of transversely extending apertures 34 by means of which a retaining bolt 35 can be inserted in a correspondingly positioned hole in pipe 32. The bolt head and shank thus retain the bowl 1 on the pedestal since the pipe opening in collar 33 forms a comparatively snug bearing fit with the pipe 32.

In conclusion, while we have described and illustrated a preferred construction for our improved grill, it will be understood that the specific details thereof are capable of modification without however departing from the spirit and scope of the inventive principles involved as expressed by the appended claim.

We claim:

A theft resistant picnic grill comprising a support pipe, a one-piece cast fire bowl having a hollow collar depending from the bottom of the bowl and isolated from the bowl interior, said collar being substantially larger than said pipe and including an axial aperture in the bottom wall thereof of substantially the same size as said pipe to pass the same into the collar, the end of said pipe bearing against the bowl bottom, said collar also including aligned transverse apertures in the side walls thereof alignable with a transverse aperture in said pipe, and a nut-locked bolt extending through said pipe aperture, the ends of said bolt extending beyond the pipe to prevent separation of said bowl and support pipe but terminating interiorly of said collar.

References Cited in the file of this patent

UNITED STATES PATENTS

| Number | Name | Date |
|---|---|---|
| 194,101 | Muller | Aug. 14, 1877 |
| 284,295 | Hailes | Sept. 4, 1883 |
| 366,960 | Johnson et al. | July 19, 1887 |
| 422,899 | Adams et al. | Mar. 11, 1890 |
| 518,243 | Hailes | Apr. 17, 1894 |
| 868,753 | Barrett | Oct. 22, 1907 |
| 1,066,552 | Taylor | July 8, 1913 |
| 1,517,161 | Kershaw | Nov. 25, 1924 |
| 1,956,387 | Hartman | Apr. 24, 1934 |
| 2,008,767 | Munn | July 23, 1935 |
| 2,012,520 | Rogers | Aug. 27, 1935 |
| 2,026,286 | Samuels | Dec. 31, 1935 |
| 2,037,386 | Hunker | Apr. 14, 1936 |
| 2,058,172 | Myers | Oct. 20, 1936 |
| 2,077,757 | Jackson | Apr. 20, 1937 |
| 2,386,815 | Rubenstein | Oct. 16, 1945 |
| 2,415,223 | Stangle | Feb. 4, 1947 |
| 2,482,068 | Larson | Sept. 13, 1949 |
| 2,513,580 | Milligan | July 4, 1950 |
| 2,534,407 | Bramberry | Dec. 19, 1950 |